US006758345B2

(12) United States Patent
Heinig, Jr.

(10) Patent No.: US 6,758,345 B2
(45) Date of Patent: Jul. 6, 2004

(54) TREATMENT MEDIA FOR WATER PURIFICATION

(75) Inventor: Charles F. Heinig, Jr., Providence, RI (US)

(73) Assignee: Aquatune, Inc., Plainville, MA (US)

( * ) Notice: Subject to any disclaimer, the term of this patent is extended or adjusted under 35 U.S.C. 154(b) by 144 days.

(21) Appl. No.: 10/071,565

(22) Filed: Feb. 8, 2002

(65) Prior Publication Data

US 2003/0150796 A1 Aug. 14, 2003

(51) Int. Cl.[7] .............................................. B01D 39/06
(52) U.S. Cl. .................... 210/501; 210/502.1; 210/764; 423/628; 502/415
(58) Field of Search ................................ 210/266, 282, 210/501, 502.1, 764; 252/175; 422/14, 28; 423/628; 502/415

(56) References Cited

U.S. PATENT DOCUMENTS

| | | | |
|---|---|---|---|
| 4,061,807 A | * 12/1977 | Shaler et al. | 428/36.4 |
| 4,504,387 A | 3/1985 | LeMire et al. | 210/101 |
| 4,608,247 A | 8/1986 | Heinig, Jr. | 424/16 |
| 4,935,116 A | 6/1990 | LeMire | 204/237 |
| 5,352,369 A | 10/1994 | Heinig, Jr. | 210/760 |
| D352,091 S | 11/1994 | LeMire et al. | D23/209 |
| 5,478,467 A | 12/1995 | LeMire et al. | 210/206 |
| 5,660,802 A | 8/1997 | Archer et al. | 422/261 |

6,471,876 B1 * 10/2002 Hansen et al.

OTHER PUBLICATIONS

"Silver Carbon Filter Purifies Swimming Pool," The Silver Institute Letter, Information on Silver for Industry, vol. III, No. 5, May 1973.
"Silver Guards Good Health," The Silver Institute Letter, Information on Silver for Industry, vol. V, No. 5, May 1975.
"Silver Clears Up Polluted Water," The Silver Institute Letter, Information on Silver for Industry, vol. III, No. 7, Jul.–Aug. 1973.
"Tests Show Silver Best Water Purifier," The Silver Institute Letter, Information on Silver for Industry, vol. VI, No. 11, Dec. 1976.
K. Wefers, et al. "Oxides and Hydroxides of Aluminum," Alcoa Laboratories, 1987, pp. 51–52 of relevance.

* cited by examiner

*Primary Examiner*—Joseph Drodge
(74) *Attorney, Agent, or Firm*—Edwards & Angell, LLP; Peter J. Manus; Richard J. Roos

(57) ABSTRACT

The present invention relates to treatment media for purifying water, and methods for forming such treatment media. Formation of the treatment media of the present invention entails heating an alumina substrate to a temperature in the range of 375° F. to 300° F. and then depositing a predetermined quantity and concentration of silver onto the activated alumina substrate such that silver ions are released and catalysis reactions occur, thus beneficially ensuring both an immediate and a residual germicidal effect to water that is treated by the treatment media.

36 Claims, 2 Drawing Sheets

TREATMENT MEDIA FOR WATER PURIFICATION

BACKGROUND OF THE INVENTION

1. Field of the Invention

The present invention relates to water purification, and particularly to treatment media for removing microscopic contaminants from water. More particularly, the present invention provides treatment media for incorporation within techniques and equipment that treat drinking water, and/or water present in pools, spas and the like with activated silver ions in order to render such water substantially free from germs, bacteria and microbes, and to residually prevent or deter the formation of such undesirable, potentially harmful contaminants for a non-nominal time following treatment of the water.

2. Description of Related Art

For many years, people of all ages have enjoyed the health benefits of consuming drinking water (e.g., tap water or well water), as well as the recreational and/or therapeutic effects of swimming, wading or simply placing themselves within water containment units (e.g., pools, soaking tubs, jacuzzis, whirlpool baths, water spas).

Over time, however, it has become known that both tap and well water, whether due to contamination of the water supply and/or of the (e.g., pipes, buckets) that transport water from the water supply to its consumers, often contain harmful bacteria, microbes, viruses, parasites, protozoa, and/or other harmful elements (collectively "germs"). And more recently, people have been alerted to the fact that water contained in pools, tubs and other similar units, if left untreated, will likewise develop the same types of germs, which can be just as harmful through prolonged (or even short term) physical contact therewith.

In reaction to such knowledge, those who oversee pools, spas and like units, or are responsible for their upkeep have taken steps to ensure that water in such units is substantially germ free. Similarly, many individuals began to treat their tap/well water prior to drinking it in hopes of eliminating germs contained therein. Unfortunately, due to problems with and/or limitations of many existing treatment methods, such efforts either are entirely ineffective to eliminate germs, or are only able to do so for short periods of time in manners wherein costly, time-consuming, and/or harmful side effects likely occur.

Currently, in-home treatment of drinking water usually consists of routing it through a rudimentary filtration unit. The majority of such units are not ideal, however, because although they are generally effective to remove some dirt, sediment and metals (e.g., lead, arsenic) from within water, they are incapable of removing germs therefrom. In fact, if a filtration unit isn't properly maintained (i.e., cleaned or replaced) within a limited time frame (i.e., from several weeks to a few months), germs could begin to form within the filter, and, in turn, could be transmitted to the water that passes through the filter.

At present, treatment of water that fills pools, spas and the like usually consists of the introduction of one or more chemicals into the water at predetermined time intervals. Such chemicals (chlorine is the most popular), if introduced in correct amounts, usually are effective to remove germs that are present within the water in these environments. Many problems, however, are associated with the use of such chemicals (especially chlorine) for this purpose.

For example, chlorine has a distinctive smell that many find unpleasant, and some even describe as overwhelming. Also, people may suffer a panoply of undesirable physical reactions (e.g., skin irritation and/or itchiness, redness and/or irritation of the eyes, negative effects on hair) upon exposure to chlorine. Further, chlorine tends to cause coloring in fabrics (i.e., bathing suits) to fade significantly if the fabrics are not thoroughly rinsed immediately upon exiting the chlorine-treated environment.

Moreover, those who are actually entrusted with adding chlorine to water are more susceptible to these risks because they encounter the chlorine in a non- or less diluted state. As such, they must exercise added care not to inhale its fumes or to allow it to contact their eyes/skin/hair. Perhaps even more importantly, they must also ensure that certain substances (e.g., other types of chlorine, certain algaecides, alkalis and acids, and even certain types of dirt and debris) do not come into contact with the chlorine prior to its dilution in order to avoid the risk of spontaneous combustion.

An additional problem linked to treating water in pools, spas or like units with chlorine is that, over time, objects (e.g., pool covers/liners, furniture) placed on, or located near such pools, spas or like units are caused to prematurely degrade—thus being rendered unsightly and/or physically unstable—due to their exposure to chlorine and/or its fumes.

Still other drawbacks of using chlorine to treat water relate to the natural effects of the outdoors. Because chlorine is a relatively volatile gas, it is rapidly dissipated from water in open atmospheres, which, unfortunately, is where pools, spas, and like units often are located. This dissipation is expedited in water that is brought to temperatures above 70° F. (and, in particular, above 85° F.), which is a temperature level that many such water units routinely reach.

Yet one cannot simply address this problem by adding more chlorine to the water when one is in doubt as to whether chlorine is needed because that would cause most, if not all of the above-indicated problems to be more prevalent and/or their effects to be magnified/heightened.

Many water treatment methods (e.g., use of magnets, oxygen generators, ozone generators, and/or ultraviolet devices) have been proposed as alternatives to those described above, but have been largely dismissed as being too costly, non-efficacious, and/or as incompatible with small-scale use (e.g., use by individual home owners to treat drinking water and/or a pool).

One treatment approach that has met with success and acceptance, however, involves the use of heavy metals—in particular, those of the type commonly referred to as "oligodynamic metals"—to eliminate germs from water.

Oligodynamic metals, especially silver ions, have a germicidal effect when present in water, even at concentration levels as low as 10 parts per billion. As a result, they can be effectively utilized to maintain germ levels in water well within tolerable ranges that permit the safe use of water both for drinking purposes and for short term or prolonged contact with the body (i.e., in pools, spas or like units).

The principal benefits of oligodynamic metal ion water treatment methods are that they are highly efficacious, are not unduly expensive or time consuming, and, arguably most importantly, their use does not present the above-indicated problems that plague use of chlorine and other chemicals.

Several patents (U.S. Pat. Nos.: 4,504,387, 4,608,247, 4,935,116, and 5,478,467) are directed to techniques and equipment for purifying water via oligodynamic metal ion treatment (e.g., silver catalysis). And while the techniques and equipment described therein represent significant improvements in terms of safety and effectiveness as compared to conventional treatment methods (e.g., drinking water filtration and use of chlorine to treat pool and spa water), there is room for improvement thereto, especially with respect to the ability of such techniques to provide residual, germicidal treatment to the water.

Therefore, an object of the present invention is to provide metal (e.g., silver) ion-based water treatment media and techniques that avoid the drawbacks of conventional alternatives, yet retain the beneficial aspects of known metal ion treatment techniques and equipment, while rendering such techniques and equipment even more effective, especially with respect to providing improved residual, germicidal treatment of water.

A related object of the present invention is to ensure that such media and techniques are rendered more effective without a noticeable increase in cost and/or in the duration/complexity thereof.

Another related object of the present invention is to ensure that such media and techniques are particularly more effective when used to treat well and/or tap water that is to be stored for non-nominal time periods prior to being consumed, and when used to treat non-filtered pools, spas and like units.

SUMMARY OF THE INVENTION

The present invention is directed to a treatment media for purifying water, and methods for forming such treatment media. In an exemplary aspect of this invention, the treatment media is provided as an alumina substrate of predetermined weight that has been heated to a temperature in the range of 375° F. to 300° F. A quantity of silver ions have been deposited on the alumina substrate in an amount such that the weight of the quantity of silver is in the range of about 1% to 10% of the predetermined weight of the alumina substrate.

Use of such a treatment medium to treat water results in improved (as compared to known conventional and specialized techniques and equipment) silver ion release and catalysis reactions such that the level of germs present within the water treated by the treatment medium, both immediately and residually following treatment, will be within tolerable levels, thus rendering such water suitable for drinking or for placement within a pool, spa or like unit.

In a related aspect of the invention, activated charcoal is introduced within the alumina as a filler material. The presence of the filler material is beneficial because of it is substantially softer than silver, and because it has excellent absorption properties. Generally, the filler material is intermixed within the alumina such that the weight ratio of activated charcoal to alumina is in the range of about 5:1 to 1:1, preferably about 2:1.

In order to ideally support the silver ions deposited thereupon, the alumina substrate should have a particle size in the range of about 4 mesh to 20 mesh (preferably in the range of about 8 mesh to 14 mesh), and a porosity that provides a surface area of greater than about 150 $in^2$/gram (preferably about 210 $in^2$/gram). The alumina substrate also should have a Mohs scale hardness greater than the hardness of silver, which has a Mohs hardness of about 2.5. Preferably, the alumina substrate has a Mohs scale hardness that is greater than about 9.0. Further, the alumina substrate should be substantially insoluble in water, and should have a pH within the range of about 5 to 9.

When included, the activated charcoal filler material should have a particle size in the range of approximately 4 mesh to 20 mesh, wherein its particle size is preferably substantially the same as that of the alumina substrate. Also, like the alumina substrate, the activated charcoal should be substantially insoluble in water, and should have a pH in the range of approximately 5 to 9. Unlike the alumina substrate, however, the activated charcoal should have a hardness less than the hardness of silver (i.e., less than about 2.5) according to the Mohs scale.

In embodiments in which filler material is intermixed within the carrier material, the weight and/or volumetric ratio of filler material to carrier material generally is in the range of about 5:1 to 1:1, preferably about 2:1.

Still other aspects and embodiments of the present invention are discussed in detail below.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views, and wherein.

DETAILED DESCRIPTION OF THE INVENTION

Figure 1:
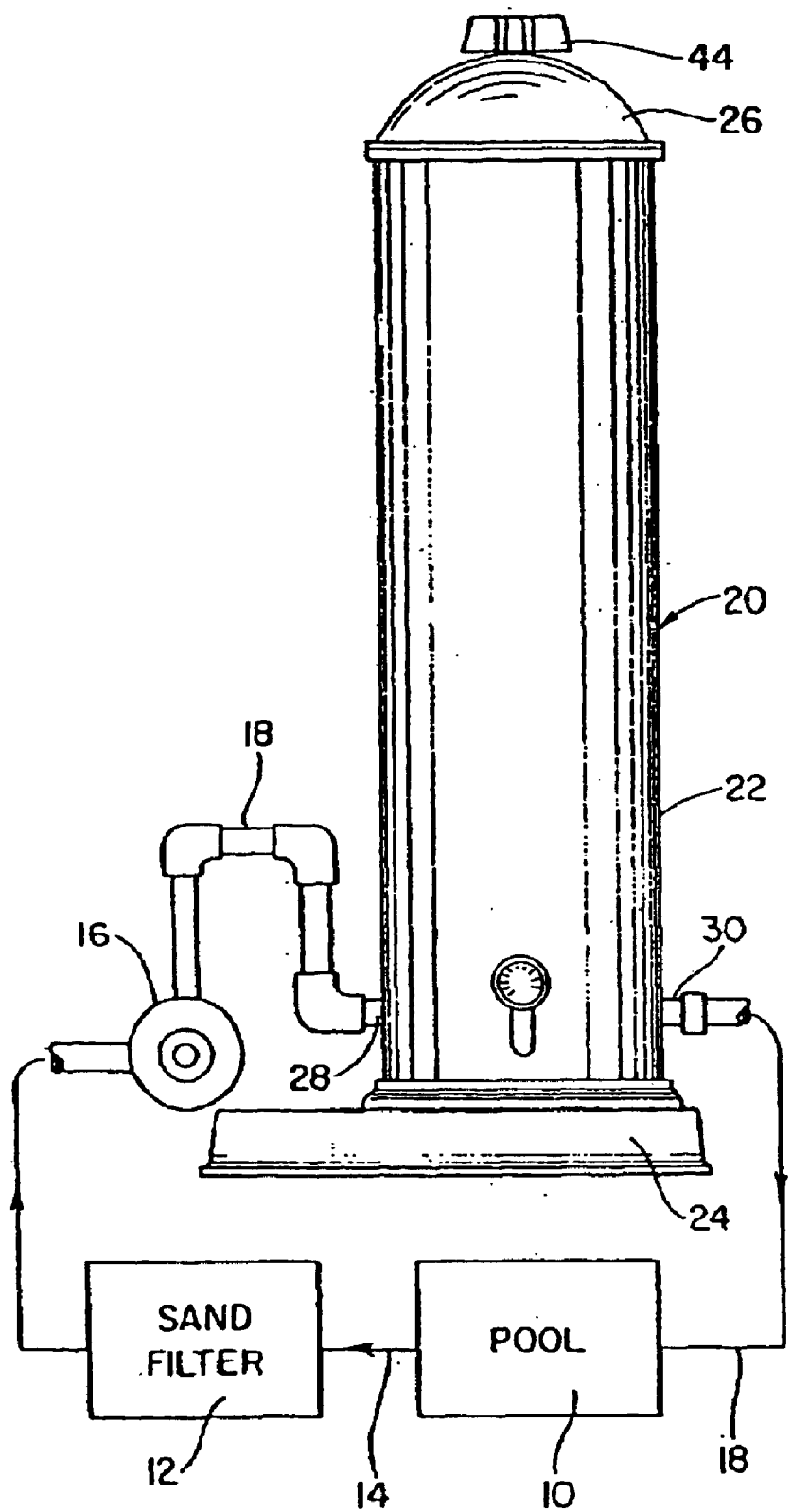
FIG. 1 illustrates a schematic view of an exemplary water treatment system in accordance with the present invention.

The present invention provides treatment media for incorporation within techniques and equipment that purify water by eliminating one or more harmful contaminants (e.g., germs, bacteria, microbes, viruses, parasites, protozoa) therefrom. For convenience, such contaminants will be referred to herein as "germs," which is understood to designate (both collectively and and/or individually) contaminants that include, but are not limited to those specifically mentioned above.

While the invention is primarily described as being applicable to the treatment of tap and well water and/or water within pools, spas and other like units, and is particularly advantageous for treatment of well and tap water that is to be stored in non-metallic containers for non-nominal time periods prior to being consumed, as well as water contained in non-filtered, non-metallic pools, spas and like units having a capacity of less than 2000 gallons, it should be understood that the treatment media of the present invention may be employed in nearly any circumstance to substantially rid water of germs.

Techniques and equipment that incorporate treatment media according to this invention also have a beneficial, residual germicidal effect on treated water—that is, for a non-nominal period following treatment of water in accord with the techniques and/or equipment, the water (by virtue of it having been treated) will resist developing new germs, and will be effective to eliminate germs that are subsequently caused to come into contact with the water.

Techniques and equipment that incorporate treatment media of the present invention are believed to represent not only improvements upon conventional water purification treatment media and techniques such as water filtration and the use of chemicals (e.g., chlorine), but also upon each of the specific techniques and equipment described in U.S. Pat. Nos. 4,504,387, 4,608,247, 4,935,116 and 5,478,467, the disclosures of which are incorporated by reference herein in their entireties.

In accordance with an exemplary embodiment of the present invention, a carrier material (i.e., a bed or substrate of material) is provided, on which silver ions will be deposited to form a treatment medium as will be described below.

In order to ideally support these silver ions, the carrier material should have a particle size in the range of about 4 mesh to 20 mesh (preferably in the range of about 8 mesh to 14 mesh), and a porosity that provides a surface area of greater than about 150 $in^2$/gram (preferably about 210 $in^2$/gram). The carrier material also should have a Mohs scale hardness greater than the hardness of silver, which has a Mohs hardness of about 2.5. Preferably, the carrier material has a Mohs scale hardness that is greater than about 9.0. Further, the carrier should be substantially insoluble in water, and should have a pH within the range of about 5 to 9.

Preferably, a quantity of filler material is introduced (e.g., intermixed) within the carrier material via any of a number of techniques known in the art. The filler material should have a particle size in the range of approximately 4 mesh to 20 mesh, wherein the particle size of the filler is preferably substantially the same as that of the carrier. Also, like the carrier material, the filler material should be substantially insoluble in water, and should have a pH in the range of approximately 5 to 9. Unlike the carrier material, however, the filler material should have a hardness less than the hardness of silver (i.e., less than about 2.5) according to the Mohs scale.

In embodiments in which filler material is intermixed within the carrier material, the weight ratio of filler material to carrier material generally is in the range of about 5:1 to 1:1, preferably about 2:1.

The carrier and filler materials can be any materials that fall within the above ranges. An exemplary carrier material is alumina (such as is described in U.S. Pat. No. 4,608,247). Suitable alumina carriers that fall within the above ranges are available from numerous commercial sources, such as Alcoa of Pittsburgh, Pa., USA. An exemplary filler material is charcoal (e.g., activated charcoal) such as is described in U.S. Pat. No. 4,608,247. Activated charcoal is a preferred filler material because it is substantially softer than silver, and because it has a number of well-known absorption properties, which make it particularly desirable for use in a water treatment system.

Once a carrier material is selected (but before silver ions are deposited thereupon) it is placed in an "activated" state by being heated to a predetermined temperature. An "activated" carrier material is advantageous because it promotes improved bonding of silver ions thereto as compared to a non-activated carrier material.

U.S. Pat. No. 4,608,247 recommends "activating" a carrier material by heating it to a temperature greater than 400° F., wherein the primary perceived benefit of doing so was that it would result in a carrier material that was highly durable, thus allowing the treatment medium in which it is incorporated to treat water for a long period of time without a substantial decrease in efficacy.

And although this activation temperature range is believed to produce a sufficiently activated carrier material, it has been found in furtherance of the present invention that activating the carrier material by heating it to a lower temperature results in a carrier material that not only is as durable and efficacious as one activated at a temperature of 400° F. or higher, but that also exhibits improved properties as compared thereto.

In accordance with the present invention, a carrier material (which optionally includes filler material) is "activated" by being heated to a temperature in the range of about 300° F. to 375° F. This produces activated alumina in the lowest temperature range of the chi (cubic) state/phase, whereas heating to a temperature of about 400° F. tends to produce alumina nearer to the kappa (orthorhombic) state/phase.

Carrier materials that are "activated" at temperatures in the range of 300° F. to 375° F. are believed to provide both a better silver ion release mechanism, and an improved silver catalytic reaction mechanism as compared to a carrier material that has been activated to a higher temperature, such as 400° F. or above.

The improved catalytic reaction mechanism allows the silver ions to assume an ionic and/or colloidal form, which, in turn allows a water treatment medium of the present invention to exhibit an improved ability to eliminate germs from water that is initially introduced into the treatment medium, while the improved release mechanism more readily allows ionic and/or colloidal silver ions "carried" by the carrier material to be released from the carrier material upon exposure to water that is being treated. These additional released silver ions, in turn, provide an additional (i.e., increased) germicidal effect on the treated water and also remain within the water following treatment to provide a beneficial, residual germicidal treatment effect.

Once the carrier material is activated, catalytically active silver ions are deposited on the carrier material (which optionally contains intermixed filler material) via any of a number of techniques known in the art (e.g., via reducing silver-containing salts) to form a treatment medium. The silver ions are deposited on the surfaces of the activated carrier material at a predetermined weight as compared to the weight of the combined weight of the carrier and, if included, the filler material.

In an exemplary embodiment of the present invention, the combined weight of the carrier and (if included) the filler material should be greater than the weight of the deposited silver ions. Preferably, the weight of the silver ions is in the range of about 1% to 10% of the weight of the carrier material plus the weight of the filler material (if included).

By way of non-limiting example, in an embodiment in which the combined weight of the carrier/filler materials is about 1000 grams, about 36 grams of silver ions are preferably deposited on the carrier/filler to form the treatment medium.

A treatment medium of the present invention can be incorporated into a number of different treatment techniques and equipment. For example, FIG. 1 depicts an exemplary system and FIGS. 2 and 3 depict an exemplary unit in which the treatment medium can be incorporated in order to treat water to eradicate germs therefrom in accordance with this invention.

Figure 2:
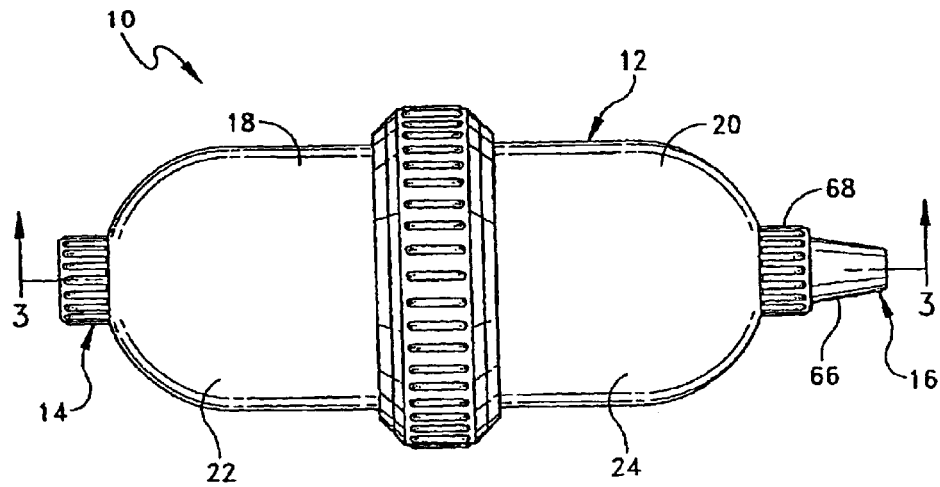
FIG. 2 illustrates a side view of an exemplary water treatment unit in accordance with the present invention.
Figure 3:
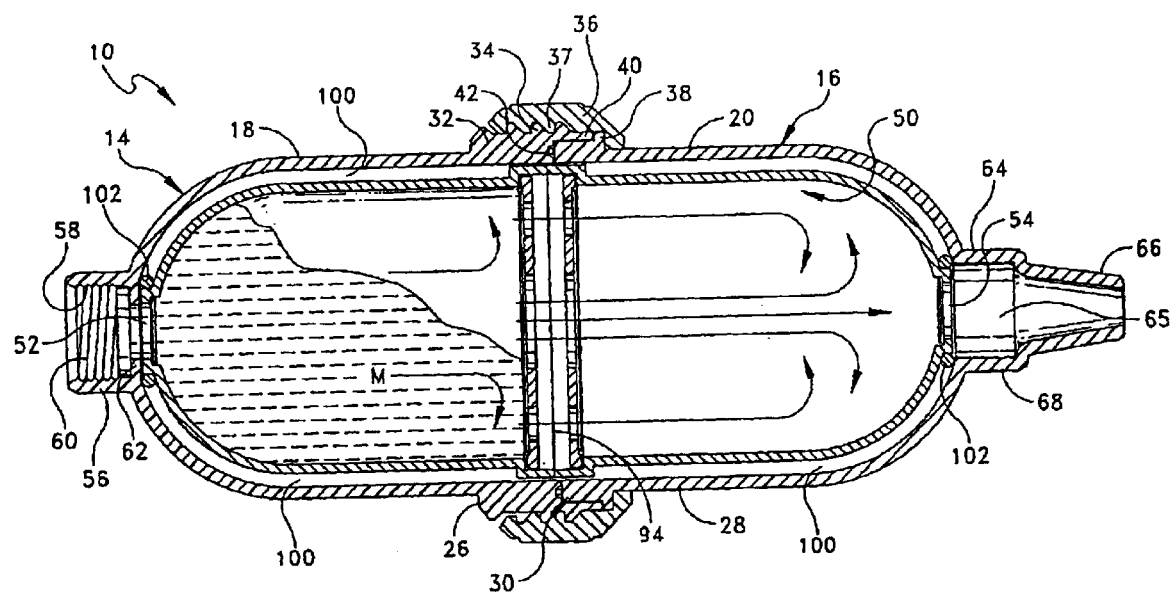
FIG. 3 illustrates a side sectional view of the unit of FIG. 2 taken along the line 3—3 of FIG. 2.

Incorporation of the treatment medium into the system of FIG. 1 provides a treatment system that is ideal for treating water within a pool, spa or similar water containment unit (especially ones that includes a filtration system), while incorporation of the treatment medium into the unit of FIGS. 2 and 3 provides a treatment unit that is ideal for treating drinking water as well as water destined for placement in pools, spas, and other like water containment units (especially those without filtration units).

Implementation, operation and function of the system of FIG. 1, (as well as a description of the illustrated reference numerals), is contained in U.S. Pat. No. 4,504,387, the disclosure of which is incorporated by reference in its entirety herein, while implementation, operation and function of the unit of FIGS. 2 and 3 (as well as a description of the illustrated reference numerals) is contained in U.S. Pat. No. 5,478,467, the disclosure of which is incorporated by reference in its entirety herein.

In furtherance of the present invention, and contrary to the disclosures of these patents, it has been found that it is preferable to supply water into and through a treatment medium of the present invention at a rate that causes silver ions to be introduced into the water at a concentration level in the range of about 50 parts per billion (ppb) to 100 parts per billion (ppb). This rate may vary, but is generally less than about 25 gallons per minute (gpm), preferably less than about 10 gpb, most preferably in the range of about 3 gpm to 4 gpm.

Each of the U.S. Pat. Nos. 4,504,387 and 5,478,467 patents recommends introducing silver ions into the water to be treated at a concentration of up to 50 ppb. In fact, the U.S. Pat. No. 5,478,467 patent specifically recommends against exceeding the 50 ppb threshold due to concerns that humans would not be able to tolerate water treated with a higher concentration of silver than 50 ppb without suffering adverse effects. Presently, however, it is believed that humans can safely tolerate water that contains silver ions at a concentration of up to 100 ppb.

Among the benefits of treating the water with an increased concentration (i.e., in the range of about 50 ppb to 100 ppb) of silver ions is a resulting increase in the germicidal effect of the silver ions both immediately and residually. That is, when water to be treated is introduced into a treatment medium that contains an increased concentration of silver ions, not only will more germs be immediately eliminated from the water, but also, more silver ions will be available to enter the water and thus provide the water with a residual ability to eliminate germs that are later introduced into the water.

In order to maximize these benefits (especially the residual treatment benefit), it is preferred to direct the treated water into a non-metallic container (e.g., a plastic pool, a plastic bottle, a plastic canteen, etc.) that is not exposed to a filtration and/or recirculation system. By preventing/limiting the interaction of the silver ions with other metals, the half-life of the silver ions in (either ionic or colloidal form) is extended and, in turn, the residual treatment ability of the silver ions is similarly extended.

Various experiments were undertaken in order to demonstrate the immediate and residual treatment efficacy of water treatment media of the present invention in comparison to predecessor treatment media.

In the first set of these experiments, several treatment media were prepared, each of which included a 1000 gram alumina substrate as a carrier material, wherein each alumina substrate had a particle size in the range of about 8 mesh to 14 mesh, a porosity that provides a surface area of greater than about 210 $in^2$/gram, a Mohs scale hardness greater than about 9.0, and a pH within the range of about 5 to 9.

Each carrier material in each of the several treatment media included activated charcoal filler material intermixed therewithin at a weight ratio of about 2:1 (filler material: carrier material), wherein the particle size of the filler material also is approximately 8 mesh to 14 mesh, the pH of the filler material is in the range of approximately 5 to 9, and the hardness of the filler material is less than about 2.5 according to the Mohs scale.

The treatment media did differ, however, in that the carrier material in a first group of treatment media was activated at a temperature of about 375° F., while the carrier material in a second group of treatment medium was activated at a temperature of about 425° F.

To complete the formation of each treatment medium, about 36 grams of silver (prepared by reducing silver-containing salts as is generally known in the art) was deposited onto each of the 1000 gram alumina substrates.

Thereafter, various quantities of tap water from the water supply of Pawtucket, R.I., USA were obtained and prepared for testing in accordance with Testing Method 922B, which is described in the $17^{th}$ edition of "Standard Methods for the Examination of Water and Wastewater" (1989).

Such preparation entailed dechlorinating the tap water with Sodium Sulfate until the water tested negative to Reagent grade DPD (N,N Diethyl-p-phenylenediamine). The water then was placed in a suitable holding area to await testing.

Such preparation further required incubating quantities of *Escherichia coli* strain ATCC 255922 (hereinafter, "*E. coli*") at approximately 37° C. for approximately 24 hours on Nutrient Agar slants (Difco) and then removing the *E. coli* using a standard buffer. The resulting suspension of cells was then diluted to 100 ml with a standard buffer, and mixed into the water within the holding area at various predetermined dilution levels.

The initial testing results are summarized in Table I below in which the abbreviations WAR, TNTC, NRT and CFU stand for, respectively "within acceptable ranges," "too numerous to count," "no reading taken," and "colony forming units."

TABLE I

| Dilution level of water | Starting level of *E Coli* in the water | Level of *E Coli* after water was passed through treatment medium with carrier material activated at about 425° F. | Level of *E Coli* after water was passed through treatment medium with carrier material activated at about 375° F. |
| --- | --- | --- | --- |
| 1:100,000 | 59 CFU/ml | WAR | WAR |
| 1:10,000 | TNTC | WAR | WAR |
| 1:1,000 | TNTC | 301 cfu/ml | 108 cfu/ml |
| 1:100 | NRT* | TNTC | TNTC |
| 1:10 | NRT* | TNTC | TNTC |

*no reading was taken because one could reasonably deduce (based on data from the 1:10,000 and 1:1,000 readings) that the reading would be "TNTC"

As shown in these experiments, both types of treatment media were effective to eliminate an acceptable amount of *E. coli* from the 1:100,000 and 1:10,000 samples, but ineffective to eliminate a noticeable amount of *E. coli* from the 1:100 and 1:10 samples.

The most telling results illustrated by Table I, however, are those obtained based on the testing of the 1:1,000 samples. Those indicate that a treatment medium that includes a carrier material activated at about 375° F. was able to eliminate 300% more *E. coli* than a treatment medium that includes a carrier material activated at about 425° F.

Other benefits of the treatment medium that includes a carrier material activated at about 375° F. versus the treatment medium that includes a carrier material activated at about 425° F. were demonstrated by subsequent experiments that were performed on the same treatment media after each of these treatment media had approximately 2000 gallons of city of Pawtucket tap water passed therethrough.

The results of these subsequent tests are shown in the table below, wherein, again, the abbreviations TNTC and CFU stand for, respectively, "too numerous to count" and "colony forming units."

TABLE II

| Dilution level of water | Starting level of E Coli in the water | Level of E Coli after water was passed through treatment medium with carrier material activated at about 425° F. | Level of E Coli after water was passed through treatment medium with carrier material activated at about 375° F. |
| --- | --- | --- | --- |
| 1:1,000 | TNTC | 78 CFU/ml | 9 CFU/ml |
| 1:100 | TNTC | TNTC | 117 CFU/ml |
| 1:10 | TNTC | TNTC | TNTC |

These results demonstrate that each of the treatment media exhibits improved performance over time, but that the performance of the treatment medium that includes a carrier material activated at about 375° F. was much more improved than that of the treatment medium that includes a carrier material activated at about 425° F.

Specifically, the treatment medium that includes a carrier material activated at about 375° F. not only was able to eliminate about 900% more *E. coli* from a 1:1,000 test sample as compared to the treatment medium that includes a carrier material activated at about 425° F., and also was able to reduce the level of *E. coli* from the 1:100 sample to 117 cfu/ml. This is in stark contrast to the treatment medium that includes a carrier material activated at about 425° F., which was unable to reduce the *E. coli* level of the 1:100 sample below the "too numerous to count" level.

A likely explanation for the difference in efficacy of the different types of treatment media after exposure to 2000 gallons of tap water is that more silver ions remained available to treat the water in the second set of experiments summarized in Table II. This was confirmed by measuring the silver output of the treatment media (1) prior to the tests summarized in Table I and then, (2) after the introduction of 2000 gallons of tap water but prior to the tests summarized in Table II.

Prior to the testing of Table I, the treatment medium that includes a carrier material activated at about 375° F. was outputting about 50 parts per billion (ppb) of silver ions into the water being treated, while the treatment medium that includes a carrier material activated at about 425° F. was outputting about 40 ppb. Although the treatment medium that includes a carrier material activated at about 375° F. was outputting only about 20% more silver ions than the treatment medium that includes a carrier material activated at about 425° F., it was effective to eliminate about 300% more *E. coli* at one of 4 measured dilution levels (as noted in Table I).

Following both the testing of Table I as well as the introduction of 2000 gallons of tap water through the treatment media (but prior to the testing in Table II), the treatment medium that includes a carrier material activated at about 375° F. was measured to be outputting about 48 ppb of silver ions (i.e., a 4% drop from its pre-Table I output level), while the treatment medium that includes a carrier material activated at about 425° F. was outputting only about 14 ppb of silver ions (i.e., a 65% drop from its pre-Table I output).

This marked decrease in the output level of the treatment medium that includes a carrier medium activated at about 425° as compared to the treatment medium that includes a carrier medium activated at about 375° strongly reflects that, contrary to beliefs within the art, there is likely no combined benefit with respect to durability and efficacy that results from activating a carrier material at a temperature greater than 400° F. In fact, it appears from this data that incorporation (within a treatment medium) of a carrier material activated at 400° or greater actually detracts from durability and efficacy of the treatment medium as compared to incorporation of a carrier material activated at a lower temperature, e.g., 375°.

As noted in Table II, although the output level of silver ions for each type of treatment medium was reduced, the efficacy of each treatment medium improved. But because the treatment medium that includes a carrier material activated at about 375° F. was outputting almost 350% more silver ions prior the testing that is detailed in Table II as compared to the treatment medium that includes a carrier material activated at about 425° F., it was able to eliminate almost 900% more *E. coli*.

This indicates that one can more confidently employ a treatment medium that includes a carrier material activated at about 375° F. as compared to a treatment medium that includes a carrier material activated at about 425° F. because the former is more stable—that is, it retains its silver output at a substantially constant level.

Moreover, by virtue of substantially retaining its silver output under such circumstances, the treatment medium that includes a carrier material activated at about 375° F. is more likely to be able to provide beneficial residual, germicidal treatment effects on treated water as compared to the treatment medium that includes a carrier material activated at about 425° F., which has fewer silver ions available to initially treat the water, let alone to enter the water to be available for residual treatment thereof.

The ability of a treatment unit to provide a residual, germicidal treatment effect is crucial, especially in certain environments such as so-called "kiddie pools (i.e., pools that hold less than 2000 gallons of water, and, generally, in the range of about 400 gallons to 1600 gallons of water), which tend to be used by very young children, who are more likely than adults to introduce germs, human and animal waste, and other potentially harmful contaminants into the water within these pools after the water has been initially treated via a treatment medium.

The foregoing description of the invention is merely illustrative thereof, and it is understood that variations and modifications can be effected without departing from the scope or spirit of the invention as set forth in the following claims. All documents mentioned herein are incorporated by reference herein in their entirety.

What is claimed is:

1. A treatment medium for purifying a quantity of water, comprising:
   an alumina substrate having been activated at a temperature in the range of 300° F. to 375° F. and having a predetermined weight; and
   a quantity of silver deposited on the alumina substrate, the quantity of silver having a predetermined weight in the range of about 1% to 10% of the predetermined weight of the alumina substrate.

2. The treatment medium of claim 1, wherein the quantity of silver is sufficient to release a concentration of silver in the range of about 50 parts per billion to 100 parts per billion to water treated by the treatment medium.

3. The treatment medium of claim 1, wherein the alumina substrate has a particle size in the range of about 4 mesh to 20 mesh.

4. The treatment medium of claim 3, wherein the alumina substrate has a particle size in the range of about 8 mesh to 14 mesh.

5. The treatment medium of claim 1, wherein the alumina substrate is substantially insoluble in water.

6. The treatment medium of claim 1, wherein the alumina substrate has a porosity that provides a surface area of at least 150 square inches per gram.

7. The treatment medium of claim 6, wherein the alumina substrate has a porosity that provides a surface area of at least 210 square inches per gram.

8. The treatment medium of claim 1, wherein the alumina substrate has a pH in the range of about 5 to 9.

9. The treatment medium of claim 1, wherein the alumina substrate has a hardness of greater than about 2.5 according to the Mohs scale.

10. The treatment medium of claim 9, wherein the alumina substrate has a hardness of greater than about 9.0 according to the Mohs scale.

11. A treatment medium for purifying a quantity of water, comprising:
   an activated alumina substrate having been activated at a temperature in the range of 300° F. to 375° F. and having a predetermined weight;
   a quantity of filler material intermixed within the alumina substrate, the quantity of filler material having a predetermined weight; and
   a quantity of silver deposited on the activated alumina substrate, wherein the quantity of silver:
   (a) has a predetermined weight in the range of about 1% to 10% of the sum of the predetermined weight of the alumina substrate and the predetermined weight of the quantity of filler material; and
   (b) is sufficient to release a concentration of silver in the range of about 50 parts per billion to 100 parts per billion to water treated by the treatment medium.

12. The treatment medium of claim 11, wherein the filler material is a charcoal.

13. The treatment medium of claim 12, wherein the filler material is activated charcoal.

14. The treatment medium of claim 11, wherein the predetermined weight of the quantity of filler material is greater than the predetermined weight of the alumina substrate.

15. The treatment medium of claim 14, wherein the predetermined weight of the quantity of filler material is greater than the predetermined weight of the alumina substrate, but less than or equal to five times the predetermined weight of the alumina substrate.

16. The treatment medium of claim 15, wherein the predetermined weight of the quantity of filler material is about two times greater than the predetermined weight of the alumina substrate.

17. The treatment medium of claim 11, wherein each of the alumina substrate and the filler material has a harness according to the Mohs scale, and wherein the hardness of the alumina substrate is greater than the hardness of the filler material.

18. The treatment medium of claim 17, wherein the hardness of the alumina substrate is greater than about 2.5 according to the Mohs scale, and the hardness of the filler material is less than about 2.5 according to the Mohs scale.

19. A method of forming a treatment medium for purifying a quantity of water, comprising the steps of:
   providing an alumina substrate having a predetermined weight;
   activating the alumina substrate at a temperature in the range of 300° F. to 375° F. for a predetermined amount of time;
   depositing a quantity of silver onto the activated alumina substrate, wherein the quantity of silver has a predetermined weight that is in the range of about 1% to 10% of the predetermined weight of the alumina substrate.

20. The method of claim 19, wherein the quantity of silver is sufficient to release a concentration of silver in the range of about 50 parts per billion to 100 parts per billion to water treated by the treatment medium.

21. A method of forming a treatment medium for purifying a quantity of water, comprising the steps of:
   providing an alumina substrate having a predetermined weight;
   introducing a quantity of filler material within the alumina substrate, the quantity of filler material having a predetermined weight;
   activating the alumina substrate with intermixed quantity of filler material at a temperature in the range of 300° F. to 375° F. for a predetermined amount of time; and
   depositing a quantity of silver onto the activated alumina substrate with introduced quantity of filler material, wherein the quantity of silver:
   (a) has a predetermined weight that is in the range of about 1% to 10% of the sum of the predetermined weight of the alumina substrate and the predetermined weight of the filler material; and
   (b) is sufficient to release a concentration of silver in the range of about 50 parts per billion to 100 parts per billion to water treated by the treatment medium.

22. The method of claim 21, wherein the filler material is a charcoal.

23. The method of claim 22, wherein the filler material is activated charcoal.

24. The method of claim 21, wherein the predetermined weight of the quantity of filler material is greater than the predetermined weight of the alumina substrate.

25. The method of claim 24, wherein the predetermined weight of the quantity of filler material is greater than the predetermined weight of the alumina substrate, but less than or equal to five times the predetermined weight of the alumina substrate.

26. The method of claim 25, wherein the predetermined weight of the quantity of filler material is about two times greater than the predetermined weight of the alumina substrate.

27. The method of claim 21, wherein each of the alumina substrate and the filler material has a harness according to the Mohs scale, and wherein the hardness of the alumina substrate is greater than the hardness of the filler material.

28. The method of claim 27, wherein the hardness of the alumina substrate is greater than about 2.5 according to the Mohs scale, and the hardness of the filler material is less than about 2.5 according to the Mohs scale.

29. A treatment medium for purifying a quantity of water for storage in a non-metallic container, comprising:
   an alumina substrate having been activated at a temperature in the range of 300° F. to 375° F. and having a predetermined weight; and
   a quantity of silver deposited on the activated alumina substrate, the quantity of silver having a predetermined weight in the range of about 1% to 10% of the predetermined weight of the alumina substrate.

30. The treatment medium of claim 29, wherein the non-metallic container is selected from the group consisting of a pool, a spa, a bottle and a canteen.

31. The treatment medium of claim 29, wherein the non-metallic container is a plastic container.

32. The treatment medium of claim 29, wherein the non-metallic container has a capacity of less than 2000 gallons.

33. A method of forming a treatment medium for purifying a quantity of water for storage in a non-metallic container, comprising the steps of:

providing an alumina substrate having a predetermined weight;

activating the alumina substrate at a temperature in the range of 300° F. to 375° F. for a predetermined amount of time;

depositing a quantity of silver onto the activated alumina substrate, wherein the quantity of silver has a predetermined weight that is in the range of about 1% to 10% of the predetermined weight of the alumina substrate.

34. The treatment medium of claim 33, wherein the non-metallic container is selected from the group consisting of a pool, a spa, a bottle and a canteen.

35. The treatment medium of claim 33, wherein the non-metallic container is a plastic container.

36. The treatment medium of claim 33, wherein the non-metallic container has a capacity of less than 2000 gallons.

* * * * *